US008046608B2

United States Patent
Pai et al.

(10) Patent No.: US 8,046,608 B2
(45) Date of Patent: Oct. 25, 2011

(54) METHOD AND SYSTEM FOR MANAGING POWER SUPPLY TO AT LEAST ONE DEVICE

(75) Inventors: Vishwas Venkatesh Pai, Karnataka (IN); Harish Kuttan, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 551 days.

(21) Appl. No.: 12/186,543

(22) Filed: Aug. 6, 2008

(65) Prior Publication Data

US 2009/0319813 A1  Dec. 24, 2009

(30) Foreign Application Priority Data

Jun. 24, 2008  (IN) .......................... 1537/CHE/2008

(51) Int. Cl.
*G06F 1/26* (2006.01)
*G06F 1/32* (2006.01)

(52) U.S. Cl. ........ 713/300; 713/320; 713/322; 713/323; 713/324; 713/340; 716/120; 716/121; 716/122

(58) Field of Classification Search .................. 713/300, 713/320, 322, 323, 324, 330; 716/120, 121, 716/122

See application file for complete search history.

(56) References Cited

U.S. PATENT DOCUMENTS

2001/0021981 A1* 9/2001 Konaka et al. ................ 713/300
2003/0023801 A1* 1/2003 Erickson et al. .............. 710/301

OTHER PUBLICATIONS http://www.acpi.info/spec.htm,7.2 Device Power Management Objects section pp. "238 to 246".
http://wwvv.acpi.info/spec.htm,Device Class PM Specifications pp. 550-573.
http://www.pcisig.com/specifications/, IOV : I/O Virtualization.
http://www.pcisig.com/specifications/, PCI-SIG—An Evolution of the Conventional PCI Specification.

* cited by examiner

*Primary Examiner* — Thomas Lee
*Assistant Examiner* — Michael J Brown

(57) ABSTRACT

A method of managing power supply to at least one device in a data processing system, the method comprising determining when the at least one device has been associated with no resources for a predetermined period of time; turning off the power supply to the at least one device; determining that the at least one device is required for use by the data processing system; and restoring the power supply to the at least one device.

16 Claims, 2 Drawing Sheets

METHOD AND SYSTEM FOR MANAGING POWER SUPPLY TO AT LEAST ONE DEVICE

RELATED APPLICATIONS

Benefit is claimed under 35 U.S.C. 119(a)-(d) to Foreign application Ser. No. 1537/CHE/2008 entitled "METHOD AND SYSTEM FOR MANAGING POWER SUPPLY TO AT LEAST ONE DEVICE" by Hewlett-Packard Development Company, L.P., filed on 24 Jun. 2007, which is herein incorporated in its entirety by reference for all purposes.

BACKGROUND TO THE INVENTION

The Advanced Configuration and Power Interface (ACPI) specification describes a standard for operating system (OS) control of devices and peripherals that are installed in a data processing system. For example, it specifies hot swapping and hot insertion of Peripheral Component Interconnect (PCI) devices within the data processing system. That is, a PCI device can be swapped or inserted while the data processing system is powered and functioning.

An example of hot insertion of a PCI device into an empty PCI slot in a data processing system is carried out as follows. Firstly, the system is informed that a device is to be inserted into a particular empty PCI slot in the data processing system. For example, a system administrator may provide commands to the data processing system that a hot insertion is about to occur. The operating system of the data processing system causes the data processing system to stop supplying power to the empty PCI slot into which the device is to be inserted. The PCI device is then physically inserted into the PCI slot. The operating system is then informed that the device has been inserted. The data processing system then resumes power to the PCI slot, performs device configuration and loads an appropriate device driver (if any) for controlling the device.

A hot swap of a PCI device is similar to a hot insertion, except that once the PCI slot is powered down, an existing PCI device is removed and replaced with another PCI device. A driver associated with the PCI device being removed may also be unloaded.

The latest ACPI specification, the contents of which are incorporated herein by reference for all purposes, is available from, for example, http://www.acpi.info/spec.htm. The current latest specification revision is 3.0b. The latest PCI specification is also incorporated herein by reference for all purposes. PCI specifications can be obtained from, for example, http://www.pcisig.com/specifications/. For example, the conventional PCI specification version 3.0 is incorporated herein by reference for all purposes.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Embodiments of the invention may manage power supply to one or more devices, such as PCI devices, in a data processing system. The PCI devices may comprise PCI cards, for example network interface cards (NICs) and other types of cards. Embodiments of the invention may selectively supply power to the devices (for example, may switch off the power supply to certain devices and restore the power supply to certain devices). Embodiments of the invention may determine those devices that appear to be unused or that may not have been used for a predetermined period of time, and switch off the power supply to those devices. Power may be selectively supplied to devices even if those devices are not specifically designed with power saving features included. Thus, embodiments of the invention may save power in data processing systems that include unused cards and/or cards that are unused for periods of time.

In a data processing system that includes one or more devices such as PCI cards, embodiments of the invention determine when one of the devices has been unused for a predetermined period of time. Once such a device has been identified, the power supply to the device is turned off, such that the device consumes little or no power. When the data processing system determines that the device is required for use, the power supply to the device is restored. However, it may be possible that full initialization is not required for the device, as the device is the same physical device that was present when the power supply to the device was switched off. Instead, a reduced initialization may be carried out, or alternatively no initialization is carried out. Thus, the device may be required for use more quickly than devices that have been newly added to the data processing system and require full initialization.

Figure 1:
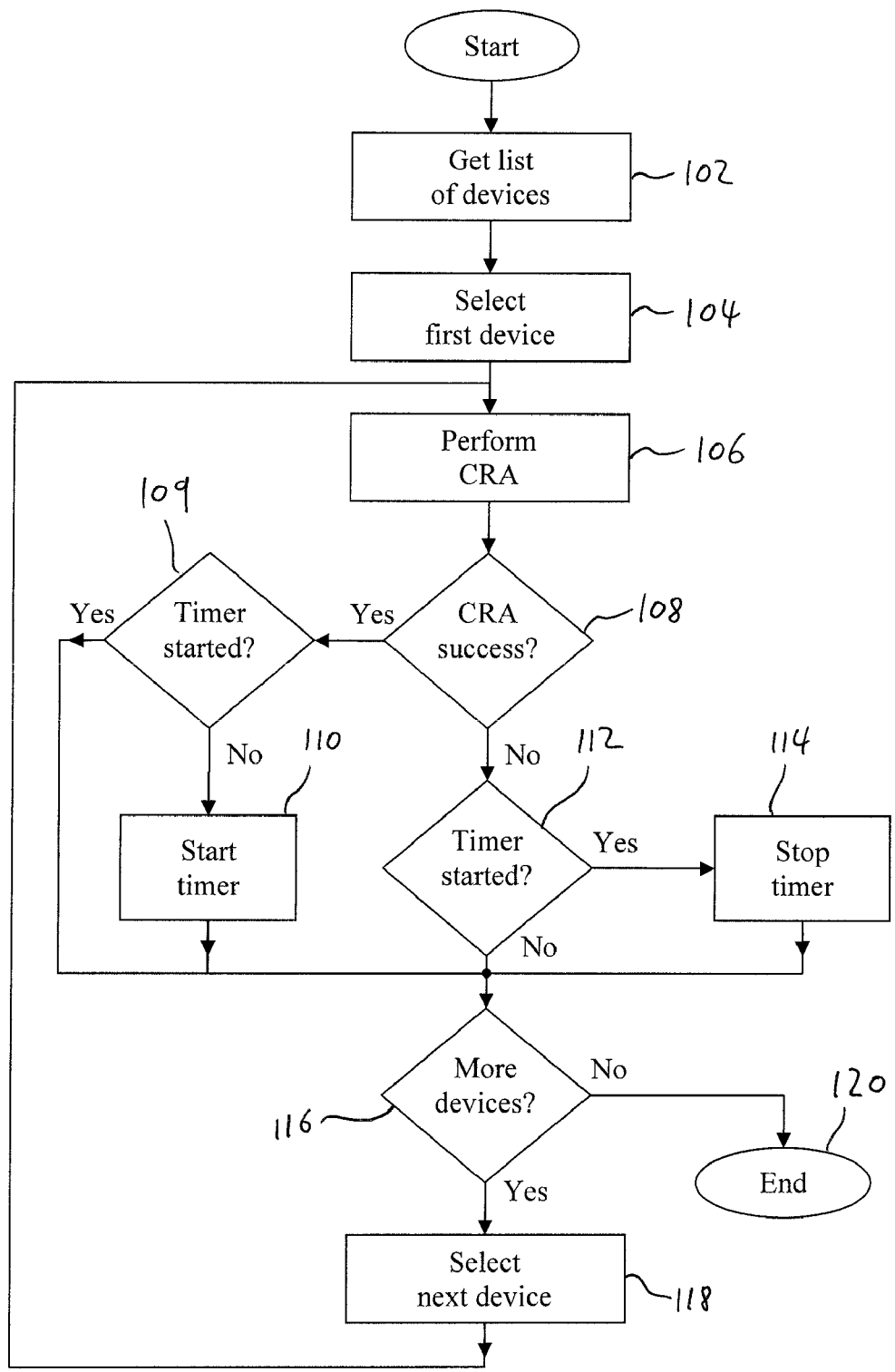
FIG. 1 shows a method of determining whether a card has been unused for a predetermined period of time according to embodiments of the invention.

FIG. 1 shows a method 100 of determining devices that have bee unused for a predetermined period of time according to embodiments of the invention. The method 100 starts at step 102 where a list of devices installed in the data processing system is obtained.

The list of devices can be obtained using one of a number of possible methods depending on the types of data processing system, installed devices and software (such as operating system) running on the data processing system. In an embodiment of the invention, the HP-UX operating system is running on the data processing system, although in other embodiments of the invention, another operating system may be used. HP-UX provides facilities to obtain a list of installed devices. For example, a hotplug utility such as the olrad command (supplied with the HP-UX operating system) can be used to obtain a list of devices installed in the data processing system as follows:

olrad -q

This command returns a list of the appropriate slots in the data processing system into which PCI cards may be installed. It also indicates whether a card is currently installed in each of the slots. In other embodiments of the invention, however, the hotplug utility may return other information, such as a list of the installed devices without a list of the slots in the data processing system.

Once a list of installed devices has been obtained in step 102 of the method 100, the first device in the list is selected in step 104. Next, in step 106, an analysis is performed to determine whether the selected device is currently associated with any resources.

A number of methods can be used to determine whether the selected device is in use depending on the implementation of the data processing system and the hardware and software installed therein. For example, embodiments of the invention may determine whether the selected device is associated with any critical resources. A device that is associated with critical resources is a device that, if removed from the data processing system, may cause the data processing system to crash, lose data, behave unpredictably and/or become unstable. A critical resource may comprise, for example, data that is stored (temporarily or permanently) by the device, or a function, service or hardware that is made available by the device to the rest of the data processing system (such as, for example, access to a network or a storage device).

Certain embodiments of the invention may also, for example, determine whether the selected device is associated with any other resources that are not critical. For example, removal of the selected device from the system when associated with non-critical re sources only may not result in the data processing system crashing or losing data, but may result in the data processing system behaving unpredictably and/or operating with reduced functionality, for example.

For example, if the operating system in the data processing system is HP-UX, Critical Resource Analysis (CRA) may be used to determine whether the selected device is associated with any resources (such as critical resources). CRA checks many aspects of the data processing system and the hardware and software installed therein, and determines whether removal of the device will cause the system to become unstable because the device is in use. Thus, it is typically used just before removal or replacement of a device in a data processing system, to determine whether removal or replacement of the device may cause the system to crash or affect the system in other ways indicated above. The olrad command can be used to perform critical resource analysis as follows:

```
olrad -C slot_id
```

In the above, slot_id is the ID of the slot in which the selected device is installed. This olrad command returns a CRA_SUCCESS, indicating that the device may be removed from the data processing system as it is not currently associated with any resources (such as critical resources), or another value indicating that there may be some system instability if the device is removed from the system as it is currently associated with one or more resources. In embodiments of the invention, if the device is in use then it is associated with one or more resources, and if a device is not in use then the device may be associated with no resources or at least no critical resources. Thus, CRA may be used to determine whether a device is in use.

From step 106, the method proceeds to step 108 where it is determined whether the selected device is in use (for example, if the olrad command returned a CRA_SUCCESS value). If the device is not in use, the method proceeds to step 109 where it is determined whether a timer associated with the selected device has been started. Each device installed in the data processing system has an associated timer, and the timers are used to determine for how long each device has been unused. If the timer associated with the selected device has not been started, then the timer is started in step 110. If the timer has already been started, then step 110 is skipped and the method 100 proceeds from step 109 to step 116.

If the determination in step 108 indicates that the device is in use (for example, the olrad command returned a value other than CRA_SUCCESS), then the method 100 continues from step 108 to step 112 where it is determined whether the timer associated with the selected device has been started. If so, then the timer is stopped and reset in step 114.

If the timer has not been started, then the method 100 instead continues to step 116. The method 100 also continues to step 116 from step 109, step 110 or step 114 as appropriate. In step 116, it is determined whether there are any more devices in the list of devices obtained in step 102. If there are further devices, then the next device in the list is selected as the selected device in step 118, and the method 100 returns to step 106. If there are no further devices then the method 100 proceeds from step 116 to step 120 where the method 100 ends.

The method 100 can be performed periodically in embodiments of the invention. Thus, the devices installed in the data processing system are monitored to determine those devices that have been unused for a predetermined period of time.

When the timer associated with a device reaches a predetermined value, indicating that the device has been unused for a predetermined period of time (for example, that the device has been associated with no resources, such as critical resources, for a predetermined period of time), then the power supply to the device is switched off. If there is a device driver associated with the device, then this driver is suspended before the power supply to the device is switched off. The device driver and/or the operating system may provide facilities, such as executable functions, that can be invoked in order to suspend the driver. The suspended driver makes no more attempts to control or interact with the associated device until the driver is resumed.

For example, in data processing systems according to embodiments of the invention, the power supply to a device is switched off by changing the device's power state to D3 (off) from another state such as D0 (fully-on), D1 or D2, according to the ACPI specification.

Power to a device can be switched off using the olrad command, supplied with the HP-UX operating system. The command also suspends a driver, if any, associated with the device whose power supply is being switched off.

The power supply to a powered-down device remains switched off until the data processing system determines that the device is required for use by the data processing system (for example, required by hardware and/or software within the data processing system). The data processing system may determine that the device is required for use using one or more of a number of methods. For example, a system administrator may provide a command to the data processing system to restore the power supply to a device whose power supply has been switched off. Alternatively, for example, an external event, such as a signal provided to the device or another device, may indicate to the data processing system that the device is required for use. Alternatively, for example, software installed in the data processing system, such as the operating system, may monitor other hardware and/or software to determine when the other hardware/software attempts to use a device whose power supply has been switched off.

When the data processing system has determined that a device is required for use, then the power supply to the device is restored. The driver, if any, associated with the device is resumed. These can be accomplished using the olrad command, for example.

When restoring the device and resuming the associated device driver, the device may need no initialization, or may need less initialization than a newly installed device, as the device is physically the same device that was present when the device's power supply was switched off. Therefore, the device can be initialized and/or returned to an operational state (in which it is ready to be used) more quickly than, for example, a device that has been added to the data processing as a new device or to replace an existing device, the added device requiring full initialization.

Thus, one or more devices in a data processing system in which one or more devices (for example, PCI cards) are installed can be powered down temporarily so as to reduce the power consumed by the overall data processing system, even if those devices are not specifically designed with features that reduce power consumption.

An example of the steps taken in a full initialization of a PCI card is shown below:
1. Check that the PCI card is installed (according to ACPI standard).
2. Check that the card is functioning (according to ACPI standard).
3. Query the card's capabilities using PCI commands.
4. Read the PCI configuration space from the PCI card and compare it with the saved configuration space (if any) that was saved before the slot associated with the card was powered off.
5. Check that the PCI bridge, if any, on the PCI card has been correctly reset.
6. Restore the PCI configuration space of the PCI card by writing the writable portion, if any, of the saved configuration space to the card's PCI configuration space.
7. Start or resume the driver (if any) associated with the PCI card.

Embodiments of the invention may omit one or more or even all of the above steps when restoring power to a device that has previously been powered down. This may be because at least some of the device's characteristics are the same once power to the device has been restored. Thus, embodiments of the invention may perform a reduced initialization or may even perform no initialization at all when restoring power to a device whose power was previously switched off after it was determined that it was not being used for a predetermined period of time.

Figure 2:
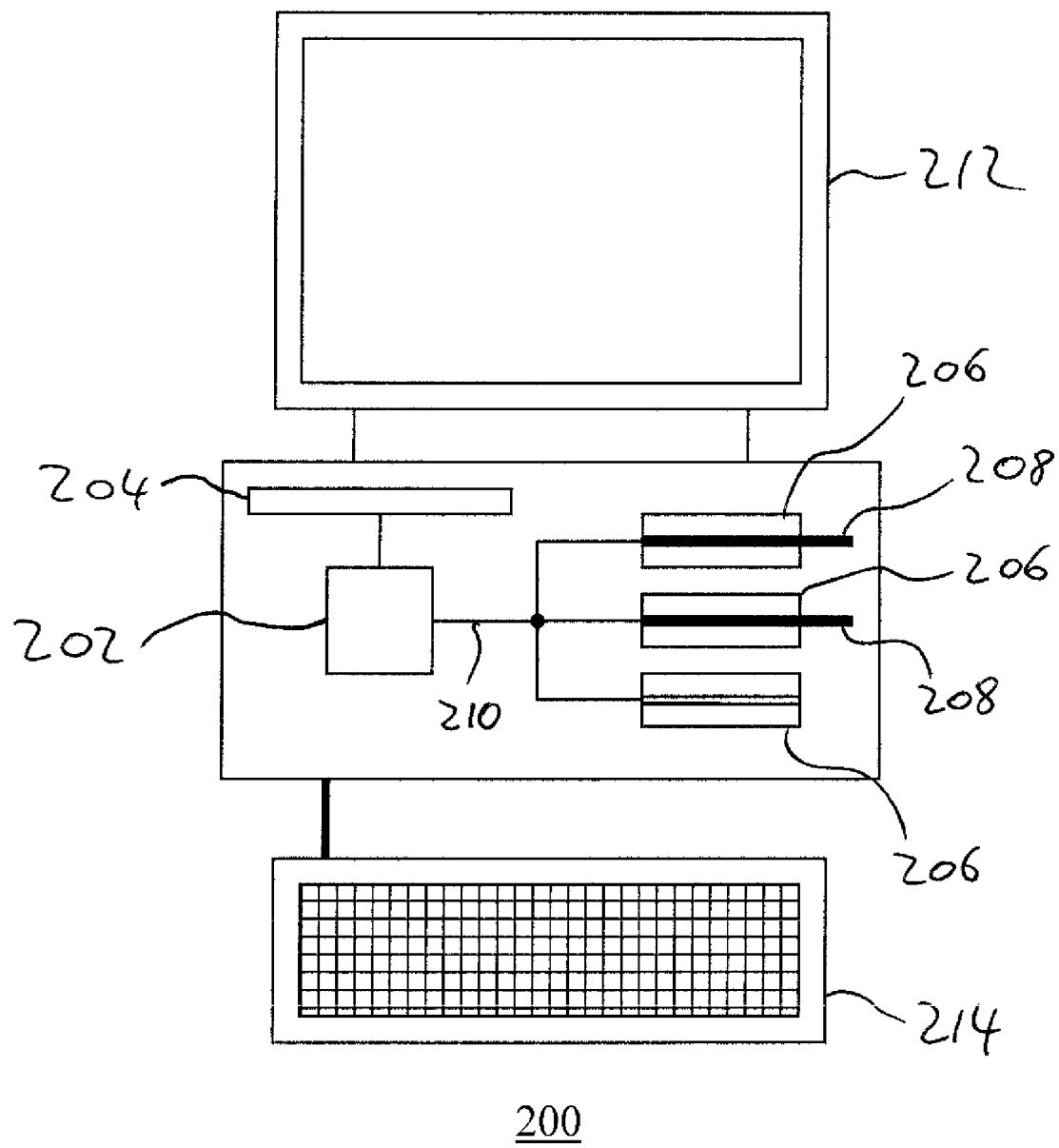
FIG. 2 shows an example of a data processing system suitable for use with embodiments of the invention.

FIG. 2 shows a data processing system 200 suitable for use with embodiments of the invention. The data processing system 200 includes a data processor 202 and memory 204 such as RAM. The system 200 also includes three PCI slots 206, although other suitable data processing systems may use other types of slot and/or a different number of slots. In the example data processing system 200 shown, two of the slots 206 have PCI cards 208 installed therein, and one slot 206 is empty. The system 200 includes a PCI bus 210 which the data processor 202 may use for communicating with the slots 206 and/or PCI cards 208 installed therein. The system 200 may also include a display device 212 and/or an interface device 214 such as a mouse and/or keyboard.

The PCI slots 206 in the data processing system 200 support device hotplugging. That is, PCI cards can be added to, removed from and replaced in PCI slots 206 while the data processing system 200 is powered on and may be operational. Thus, the PCI bus 210 may support hotplugging. The PCI bus 210 may include a PCI bus controller (not shown). It should be noted that the PCI bus itself supports hotplugging, while the data processing system and PCI cards themselves may not, for example through physical and/or mechanical constraints of the system. In other embodiments of the invention, the same features and capabilities of the PCI bus, slots and cards as described above may be provided by other types of bus, slots and/or devices.

Embodiments of the invention may be incorporated into an operating system, such as the HP-UX operating system. For example, the operating system may be provided with functionality that determines when a device has been unused for a predetermined period of time, and switch off the power supply to the device. Additionally or alternatively, the operating system may be provided with functionality that determines when a device is required for use, and may restore the power supply to the device and/or signal to other software and/or hardware that the device is required for use.

In other embodiments of the invention, means are provided that provide similar functionality to the olrad command. For example, embodiments of the invention provide the means to obtain a list of devices installed in the data processing system, the means to determine whether a selected device is in use and/or the means to switch power supply to a device on and off. Thus, embodiments of the invention may be operable where the olrad command is unavailable, for example.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of managing power supply to at least one device in a data processing system, the method comprising:
  determining when the at least one device has been associated with no resources for a predetermined period of time, comprising performing an analysis to determine whether the at least one device is associated with any critical resources;
  turning off the power supply to the at least one device;
  determining that the at least one device is required for use by the data processing system; and
  restoring the power supply to the at least one device.

2. A method as claimed in claim 1, wherein restoring the power supply to the at least one device comprises restoring the power supply and performing one of a reduced initialization and no initialization.

3. A method as claimed in claim 1, further comprising, before turning off the power supply to the at least one device, determining whether a driver is associated with the at least one device, and if so, suspending the driver.

4. A method as claimed in claim 1, further comprising, after restoring the power supply to the at least one device, determining whether a driver is associated with the at least one device, and if so, restoring the driver.

5. A method as claimed in claim 1, wherein performing an analysis to determine whether the at least one device is associated with any critical resources comprises using critical resource analysis, wherein using critical resource analysis comprises determining whether removal of the at least one device will cause the data processing system to crash, lose data, behave unpredictably, and/or become unstable.

6. A computer program product for managing power supply to at least one device in a data processing system, the computer program product comprising a non-transitory storage medium readable by a processing circuit and storing instruction for execution by a processing circuit for performing a method as claimed in claim 1.

7. A data processing system having loaded therein a computer program as claimed in claim 6.

8. A method as claimed in claim 1, wherein determining when the at least one device has been associated with no resources for a predetermined period of time further comprises determining whether the at least one device is in use.

9. A method as claimed in claim 8, wherein determining whether the at least one device is in use comprises:
 if the at least one device is not in use, determining whether a timer associated with the at least one device has been started; and
 starting the timer if the timer has not been started.

10. A method as claimed in claim 8, wherein determining whether the at least one device is in use comprises:
 if the at least one device is in use, determining whether a timer associated with the at least one device has been started; and
 stopping and resetting the timer if the timer has been started.

11. A system for managing power supply to at least one device in a data processing system, the system arranged to:
 determine when the at least one device has been associated with no resources for a predetermined period of time, the determination comprised to perform an analysis to determine whether the at least one device is associated with any critical resources;
 turn off the power supply to the at least one device;
 determine that the at least one device is required for use by the data processing system; and
 restore the power supply to the at least one device.

12. A system as claimed in claim 11, wherein restoring the power supply to the at least one device comprises restoring the power supply without performing at least some reinitialization of the device.

13. A system as claimed in claim 11, further comprising, before turning off the power supply to the at least one device, determining whether a driver is associated with the at least one device, and if so, suspending the driver.

14. A system as claimed in claim 11, further comprising, after restoring the power supply to the at least one device, determining whether a driver is associated with the at least one device, and if so, restoring the driver.

15. A system as claimed in claim 11, comprising a data processor, a plurality of device slots and a bus connecting the data processor and the device slots, the bus supporting hot-plugging of devices in the device slots, wherein the determination comprised to perform an analysis to determine whether the at least one device is associated with any critical resources further comprises using critical resource analysis, wherein using critical resource analysis comprises determining whether removal of the at least one device will cause the data processing system to crash, lose data, behave unpredictably, and/or become unstable.

16. A data processing system including the system as claimed in claim 11.

* * * * *